United States Patent
Meyer (10) Patent No.: US 11,325,265 B2
(45) Date of Patent: May 10, 2022

(54) APPARATUSES, SYSTEMS, AND METHODS FOR THE GRASPING OF OBJECTS

(71) Applicant: OMNICELL, INC., Mountain View, CA (US)

(72) Inventor: William A. Meyer, Wexford, PA (US)

(73) Assignee: OMNICELL, INC., Mountain View, CA (US)

( * ) Notice: Subject to any disclaimer, the term of this patent is extended or adjusted under 35 U.S.C. 154(b) by 29 days.

(21) Appl. No.: 16/915,113

(22) Filed: Jun. 29, 2020

(65) Prior Publication Data

US 2021/0402621 A1 Dec. 30, 2021

(51) Int. Cl.
*B25J 15/06* (2006.01)
*B25J 15/04* (2006.01)

(52) U.S. Cl.
CPC ....... *B25J 15/0616* (2013.01); *B25J 15/0408* (2013.01); *B25J 15/0441* (2013.01)

(58) Field of Classification Search
CPC .. B25J 15/0616; B25J 15/0441; B66C 1/0243
See application file for complete search history.

(56) References Cited

U.S. PATENT DOCUMENTS

| | | | |
|---|---|---|---|
| 7,648,182 B2 * | 1/2010 | Salimkhan | B25J 15/0616 294/65 |
| 10,335,820 B2 | 7/2019 | Manabe et al. | |
| 11,091,355 B1 * | 8/2021 | Lilliston, III | B25J 15/0683 |
| 2003/0107227 A1 * | 6/2003 | Nagler | B25J 15/0616 294/188 |
| 2011/0202171 A1 | 8/2011 | Rosenbaum | |
| 2018/0092263 A1 * | 3/2018 | Yokoyama | H05K 13/0409 |
| 2019/0217471 A1 | 7/2019 | Romano | |

FOREIGN PATENT DOCUMENTS

| | | | |
|---|---|---|---|
| CA | 3084685 A1 | 6/2019 | |
| JP | S5827093 U | 2/1983 | |
| JP | 2004158658 A | 6/2004 | |
| WO | WO 2006/061677 A1 | 6/2006 | |
| WO | WO-2012140356 A1 * | 10/2012 | B25J 15/0416 |

OTHER PUBLICATIONS

International Search Report and Written Opinion for PCT/US2021/017542 (ISA/EP) dated Jul. 6, 2021 (13 pages).

* cited by examiner

*Primary Examiner* — Dean J Kramer
(74) *Attorney, Agent, or Firm* — Alston & Bird LLP (57) ABSTRACT

Provided herein is an apparatus and system to increase the capacity for grasping or engagement of an object using an accessory tool. Methods of increasing the capacity of a tool can include: engaging an accessory tool with a tool, where the tool includes a first vacuum cup and the accessory tool includes one or more second vacuum cups; securing the tool to the accessory tool with a securing mechanism; drawing a vacuum through the first vacuum cup, where the vacuum is drawn through the one or more second vacuum cups in response to drawing a vacuum through the first vacuum cup while the accessory tool is engaged with the tool; and grasping an object with the second one or more vacuum cups in response to vacuum drawn through the one or more second vacuum cups and the one or more second vacuum cups engaging a surface of the object.

19 Claims, 8 Drawing Sheets

APPARATUSES, SYSTEMS, AND METHODS FOR THE GRASPING OF OBJECTS

TECHNOLOGICAL FIELD

Embodiments of the present disclosure relate generally to grasping and advancing objects in an environment, and in particular, to increasing the capacity for grasping or engaging an object using an accessory tool that can be attached and released from the tool without a docking station or mechanical lock.

BACKGROUND

The retrieval and movement of objects within an environment is a common practice that can often be time consuming and prone to error, particularly when performed manually. The automation of retrieval and movement of objects within an environment can improve both efficiency and accuracy of the operation. Automated retrieval and movement of objects within an environment can be costly, and if the process is not frequent enough, or if there is a low-risk associated with errors, the cost of automation may not be justified.

The grasping and transporting of objects can be performed in numerous ways using various methods of grasping objects. However, the method of grasping a first product of a first size or weight may not be well suited for grasping a second product of a second size or weight. The use of different grasping methods or grasping tools may add expense and may increase the complexity of a retrieval and transporting system.

SUMMARY

Embodiments of the present disclosure may provide an accessory tool including: an accessory tool body defining, on a first side a receiver, and defining within the accessory tool body a manifold, where a first opening to the manifold is defined within the receiver, and one or more second openings to the manifold are defined within a second side of the accessory tool body, opposite the first side; one or more second vacuum cups attached to the second side of the accessory body, where each of the one or more second vacuum cups is in fluid communication with a respective second opening; and a securing mechanism within the receiver, where in response to a tool received within the receiver and a first vacuum cup of the tool engaging with the first opening, the securing mechanism secures the tool in the receiver. The securing mechanism of an example embodiment enables separation of the accessory tool from the tool in response to a separation force of the tool from the receiver above a predefined value, and where the predefined value is greater than a weight of the tool.

In response to the first vacuum cup of the tool attaching to the first opening and drawing a vacuum, vacuum is drawn through each of the one or more second vacuum cups of the accessory tool. The first vacuum cup of the tool may define a first contact area, where the one or more second vacuum cups attached to the accessory tool body define a second contact area, where the second contact area is a sum of contact areas of each of the one or more second vacuum cups attached to the accessory tool, where the second contact area is greater than the first contact area. The one or more second vacuum cups of the accessory tool may be configured to attach to an object with an accessory tool engagement force in response to the first vacuum cup of the tool engaging with the first opening and drawing a vacuum of a first pressure through the first vacuum cup of the tool while the one or more second vacuum cups of the accessory tool are in contact with the object. The accessory tool engagement force may be greater than a force with which the vacuum cup of the tool can engage an object while drawing a vacuum of the first pressure.

According to an example embodiment, the securing mechanism may include a canted spring disposed within the receiver and a complementary groove in the tool, where the canted spring engages the groove in response to the tool being received within the receiver. The securing mechanism may include at least one magnet, where the at least one magnet provides engagement between the tool and the receiver in response to the tool being received within the receiver. The securing mechanism provides a securing force between the tool and the receiver of the accessory tool body. The tool is removable from the receiver in response to: the one or more second vacuum cups of the accessory tool engaging a surface; a vacuum of a first pressure drawn on the first vacuum cup of the tool causing suction engagement between the one or more second vacuum cups of the accessory tool with the surface; and the tool being withdrawn from the receiver with a force greater than the securing force. The securing force is lower than an engagement force between the one or more second vacuum cups of the accessory tool and the surface.

Embodiments provided herein include a system for increasing the capacity of a tool including: a tool having a tool body and a first vacuum cup extending from a leading end of the tool body; an accessory tool having an accessory tool body defining, on a first side a receiver, and defining within the accessory tool body a manifold, where a first opening to the manifold is defined within the receiver, and one or more second openings to the manifold are defined within a second side of the accessory tool body, opposite the first side; one or more second vacuum cups attached to the second side of the accessory tool body, where each of the one or more second vacuum cups is in fluid communication with a respective second opening; and a securing mechanism to secure the tool to the accessory tool, where in response to the leading end of the tool body being received within the receiver, the securing mechanism secures the accessory tool to the tool body with a securing force.

The tool and the accessory tool are separable in response to a separation force between the tool and the accessory tool above a predefined value, where the predefined value is greater than a weight of the accessory tool. Embodiments optionally include a vacuum source, where a vacuum is drawn through the one or more second vacuum cups in response to the tool engaging the accessory tool, the first vacuum cup engaging the first opening to the manifold, and the vacuum source drawing vacuum through the first vacuum cup. The first vacuum cup may define a first engagement area, where the one or more second vacuum cups define a second engagement area greater than the first engagement area, where a lifting capacity of the one or more second vacuum cups is greater than a lifting capacity of the first vacuum cup. The first vacuum cup has a first lifting capacity, where the one or more second vacuum cups has a second lifting capacity, where the second lifting capacity is a sum of the securing force with the first lifting capacity. The one or more second vacuum cups has an engagement capacity whereby the one or more second vacuum cups engage a surface, and where the engagement capacity is greater than a second lifting capacity.

Embodiments provided herein include a method of increasing the capacity of a tool including: engaging an accessory tool with a tool, where the tool includes a first vacuum cup and the accessory tool includes one or more second vacuum cups; securing the tool to the accessory tool with a securing mechanism; drawing a vacuum through the first vacuum cup, where the vacuum is drawn through the one or more second vacuum cups in response to drawing a vacuum through the first vacuum cup while the accessory tool is engaged with the tool; and grasping an object with the second one or more vacuum cups in response to vacuum drawn through the one or more second vacuum cups and the one or more second vacuum cups engaging a surface of the object.

Securing the tool to the accessory tool with a securing mechanism may include securing the tool to the accessory tool with a securing force, where the tool is separable from the accessory tool in response to the tool being pulled relative to the accessory tool with a force greater than the securing force. Methods may include: removing the accessory tool from the tool by: engaging a fixed surface with an engagement force in response to a vacuum being drawn through the one or more second vacuum cups and the one or more second vacuum cups being brought into contact with the fixed surface; and moving the tool away from the fixed surface with a force greater than the securing force, where the decoupling force is greater than a weight of the accessory tool, and less than the engagement force.

Embodiments provided herein include a detachable accessory tool for use in grasping objects, the detachable accessory tool including: an accessory tool body defining a first end and a second end defining a passage therethrough and adapted to temporarily couple with a leading end of a primary tool, where the first end of the accessory tool body is adapted to interface with the leading end of the primary tool, where the second end of the accessory tool body includes one or more vacuum cups adapted to securely hold and displace an object from an object origin to an object destination, and where the accessory tool is adapted to decouple from the primary tool at any horizontal surface.

The primary tool of an example embodiment is fluidically connected to the one or more vacuum cups of the accessory tool in response to the accessory tool being coupled to the first end of the primary tool. The primary tool may be adapted to temporarily couple with the leading end of the accessory tool using a securing mechanism, where the securing mechanism provides a frictional engagement between the accessory tool and the primary tool. The accessory tool may be adapted to decouple from the primary tool at any horizontal surface in response to vacuum drawn through the one or more vacuum cups to engage the horizontal surface with the one or more vacuum cups and the primary tool being moved away from the horizontal surface with a force sufficient to overcome the frictional engagement between the accessory tool and the primary tool.

DESCRIPTION OF THE DRAWINGS

Reference now will be made to the accompanying drawings, which are not necessarily drawn to scale, and wherein.

DETAILED DESCRIPTION

Embodiments of the present disclosure may provide various apparatuses, systems, and methods for improving the efficiency and capacity of grasping and advancing or transporting of objects within an environment, such as in an automated dispensing system. Some embodiments and components of the present disclosure will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements.

Example embodiments of the present disclosure may provide a method, apparatus, and computer program product which facilitate the automated grasping or retrieval of objects and transporting them within an environment such as an automated dispensing system. Embodiments improve the efficiency and capacity of such grasping and transporting through the addition of an accessory tool that multiplies the force with which a tool may engage an object and increases the surface area contact and/or changes the configuration of the surface area contact to permit faster, more efficient transport of an object through an environment, whether retrieving the object for dispensing or moving an object for storage or organization. Embodiments solve issues identified by the applicant as substantial hurdles in grasping and transporting objects within an environment, particularly larger or heavier objects, while retaining the ability to grasp and transport relatively smaller objects with equal efficiency.

While embodiments of the present disclosure may be implemented in various environments for grasping and transporting of articles, an example embodiment will be described herein relating to an automated dispensing system, where embodiments may be configured to grasp and transport items to or from an inventory in a limited environment that may be within an operating envelope of a robot. A robot, as described herein, may include a multi-axis robot such as a six-axis arm with an end-of-arm tool, or may include a gantry-type robot that is suspended above a working environment with a tool that is raised and lowered from an X-Y position established by the gantry. Regardless of the implementation, embodiments described herein will be understood by one of ordinary skill in the art to improve the grasping and holding capacity of a tool which may allow a tool to move faster and more efficiently while also being able to transport heavier and/or larger articles.

Figure 1:
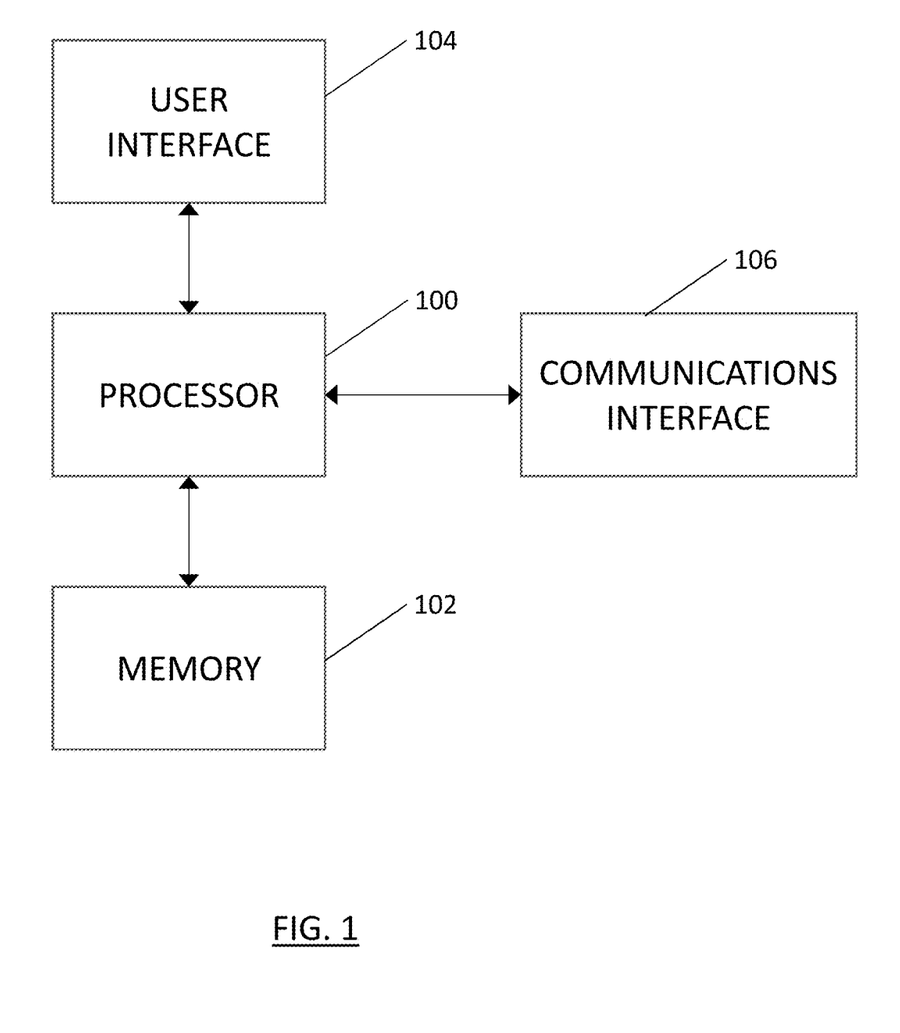
FIG. 1 illustrates a controller for controlling a robot including an end-of-arm tool and a detachable accessory tool according to an example embodiment of the present disclosure.

Automated dispensing systems, as described herein, retrieve and transport articles within a working environment. An automated dispensing system may require a controller configured to control the functions of the automated dispensing including controlling the movement of a dispensing robot and tool associated therewith (e.g., an end-of-arm tool). The controller may be configured in a variety of manners, an example of which is illustrated in FIG. 1. The controller of example embodiments may include processing circuitry. The processing circuitry may be configured to perform actions in accordance with one or more example embodiments disclosed herein. In this regard, the processing circuitry may be configured to perform and/or control performance of one or more functionalities of the handling, storing, or distributing of articles in accordance with various example embodiments. The processing circuitry may be configured to perform data processing, application execution, and/or other processing and management services according to one or more example embodiments. In some embodiments, computing device or a portion(s) or component(s) thereof, such as the processing circuitry, may be embodied as or comprise a circuit chip. The circuit chip may constitute means for performing one or more operations for providing the functionalities described herein.

A schematic illustration of an apparatus which may be implemented as a controller of an automated dispensing system is illustrated in FIG. 1. As shown, in some example embodiments, the processing circuitry may include a processor 100 and, in some embodiments, may further include memory 102. The processing circuitry may be in communication with, include or otherwise control a user interface 104 and/or a communication interface 106. As such, the processing circuitry may be embodied as a circuit chip (e.g., an integrated circuit chip) configured (e.g., with hardware, software, or a combination of hardware and software) to perform operations described herein.

The processor 100 may be embodied in a number of different ways. For example, the processor may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. Although illustrated as a single processor, it will be appreciated that the processor may comprise a plurality of processors. The plurality of processors may be in operative communication with each other and may be collectively configured to perform one or more functionalities of a system for handling, storing, transporting, or distributing medication as described herein. The plurality of processors may be embodied on a single computing device or distributed across a plurality of computing devices. In some example embodiments, the processor may be configured to execute instructions stored in the memory or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA, or the like, the processor may be specifically configured hardware for conducting the operations described herein. Alternatively, as another example, when the processor is embodied as an executor of software instructions, the instructions may specifically configure the processor to perform one or more operations described herein.

In some example embodiments, the memory 102 may include one or more non-transitory memory devices such as, for example, volatile and/or non-volatile memory that may be either fixed or removable. In this regard, the memory 102 may comprise a non-transitory computer-readable storage medium. It will be appreciated that while the memory 102 is illustrated as a single memory, the memory may comprise a plurality of memories. The plurality of memories may be embodied on a single computing device or may be distributed across a plurality of computing. The memory may be configured to store information, data, applications, instructions and/or the like for enabling embodiments of the present invention to carry out various functions in accordance with one or more example embodiments. For example, the memory may be configured to buffer input data for processing by the processor. Additionally or alternatively, the memory may be configured to store instructions for execution by the processor. As yet another alternative, the memory may include one or more databases that may store a variety of files, contents, or data sets. Among the contents of the memory, applications may be stored for execution by the processor to carry out the functionality associated with each respective application. The memory may optionally store object locations within the operating envelope or environment of the dispensing system to facilitate retrieval of the objects. The memory may optionally store the location of one or more accessory tools within the operating envelope such that a robot controlled by the controller may readily locate and couple with an accessory tool as needed.

A user interface 104 of example embodiments, such as the user interface of a user module of an automated dispensing system, may be in communication with the processing circuitry to receive an indication of a user input at the user interface and/or to provide an audible, visual, mechanical, or other output to the user. As such, the user interface 104 may include, for example, a user input interface such as a keyboard, a mouse, a joystick, a display, a touch screen display, a microphone, a speaker, and/or other input/output mechanisms. As such, the user interface 104 may, in some example embodiments, provide means for user control of embodiments of the present invention. In some example embodiments in which the invention is embodied as a server, cloud computing system, or the like, aspects of the user interface may be limited or the user interface may not be present. In some example embodiments, one or more aspects of the user interface may be implemented on a user terminal. Accordingly, regardless of implementation, the user interface may provide input and output means to facilitate handling, storing, transporting, or delivery of medication in accordance with one or more example embodiments.

The communication interface 106 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry. By way of example, the communication interface 106 may be configured to enable embodiments of the present invention to communicate with application server(s) and/or networks and/or information databases. Accordingly, the communication interface may, for example, include supporting hardware and/or software for enabling communications via cable, digital subscriber line (DSL), universal serial bus (USB), Ethernet, or other methods.

Figure 2:
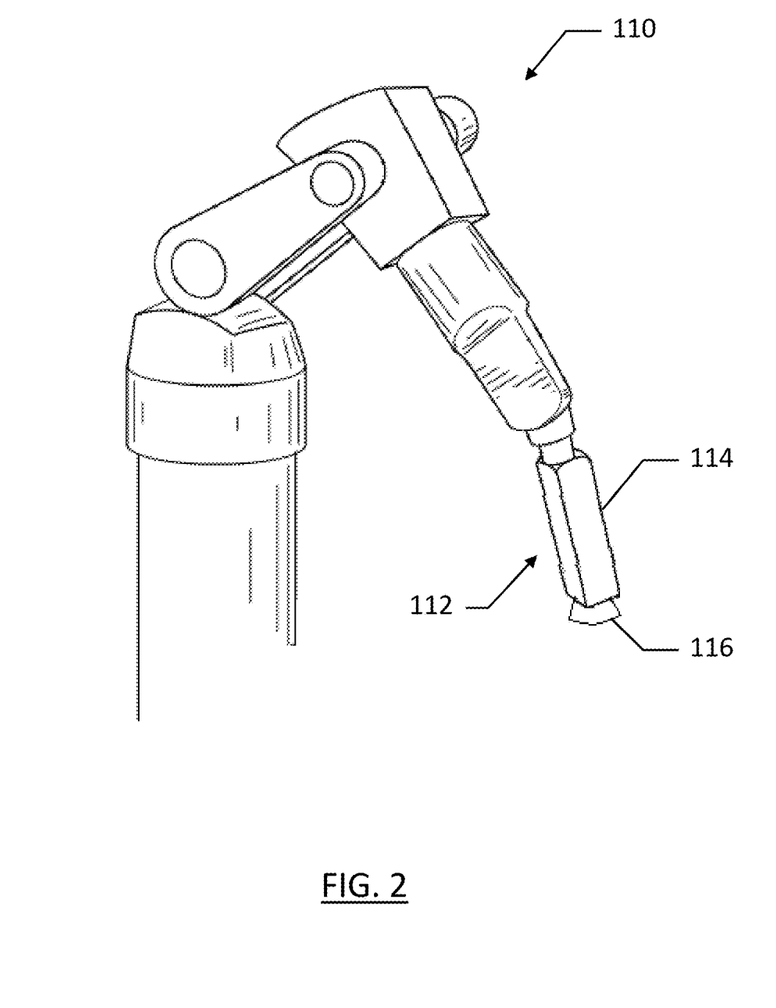
FIG. 2 illustrates a multi-axis robot including an end-of-arm tool according to an example embodiment of the present disclosure.

FIG. 2 illustrates an example embodiment of a robot 110, which may be controlled by a controller such as that illustrated in FIG. 1. The robot 110 of the embodiment of FIG. 2 is a multi-axis arm robot including an end-of-arm tool 112. The end-of-arm tool 112 may be any of a variety of tools or connectors for which a variety of tools may be attached. In the instant embodiment, the end-of-arm tool includes a tool body 114 and a vacuum cup 116. The vacuum cup 116 may be in fluid communication with a vacuum source (not shown) through a conduit that may run through the robot 110. The vacuum source, the robot 110, and the end-of-arm tool 112 may be controlled by the controller, such as that of FIG. 1.

The end-of-arm tool 112 of FIG. 2 may be used to grasp and retrieve various types of articles. The robot 110 may move the end-of-arm tool 112 to a location identified to have a product to be retrieved. The location may be a predetermined location such as a bin of a tray, a recess within a drawer, or any other location where an object may be stored for later retrieval. The robot 110 may move the end-of-arm tool 112 into contact with the object by advancing the vacuum cup 116 to a surface of the object. The vacuum source may draw a vacuum such that the vacuum cup 116 engages the object and grasps the object with a force corresponding to a contact area of the vacuum cup and pressure of the vacuum. While the vacuum source is described herein as drawing a vacuum, the drawing of a vacuum is any pressure below the atmospheric pressure in which the robot 110 is operating. Said differently, the vacuum source causes a negative gage pressure at the vacuum cup 116, and that negative pressure may be controlled, such as by the controller of FIG. 1. The negative pressure may be variable such as to draw only a vacuum needed for the vacuum cup to engage and grasp an object, and not strong enough negative pressure as to damage the object or to substantially deform the engaged surface of the object. Thus, the phrase "drawing a vacuum" as used herein refers to drawing negative gage pressure, or pressure lower than atmospheric pressure of the robot's operating environment.

The vacuum cup may be made of a flexible material such as a rubber, silicone, etc. while surface of the vacuum cup 116 may be of the same flexible material, or may include a foam or other material that can be employed to complement an uneven surface of an object to be grasped. For example, a lid of a container may include raised or embossed lettering such that the surface is not smooth. While a vacuum cup such as vacuum cup 116 may engage the uneven surface sufficiently to grasp the object, the uneven surface may cause vacuum leaks. As such, a foam or other material disposed about a periphery of the contact surface of the vacuum cup may be employed to accommodate uneven surfaces.

The force with which an object may be grasped by embodiments described herein may be limited by the surface area or area of the object within the periphery of the vacuum cup 112 (e.g., a contact area) and the negative pressure that can be drawn by the vacuum source. This grasping force limits the weight of an object that can be grasped. Further, while the vacuum source may be capable of drawing substantial negative pressure, the types of objects retrieved may not be conducive to negative pressures above a certain amount. For example, it may not be suitable for an object that is of a thin paper/cardstock or of a plastic film to be grasped by a high negative pressure as the high negative pressure may deform or damage the object being retrieved or packaging thereof. Still further, while a tool such as the end-of-arm 112 tool of FIG. 2 may be capable of grasping and lifting an object of a particular weight, movement of the object by the robot 110 once retrieved may lead to the object being dropped due to a shift of weight of the object relative to the vacuum cup 112 and cause the vacuum cup to separate from the object resulting in a drop. The size of the object may also limit the movement available to the robot 110 without dropping the object.

Embodiments described herein provide a mechanism by which the lifting capacity of the end-of-arm tool 112 may be increased and may improve the handling/movement abilities of the robot 110 once an object is retrieved. Still further, the mechanism described herein may be readily attached and detached from the end-of-arm tool 110 without additional hardware or mechanical latching/unlatching of the mechanism.

Figure 3:
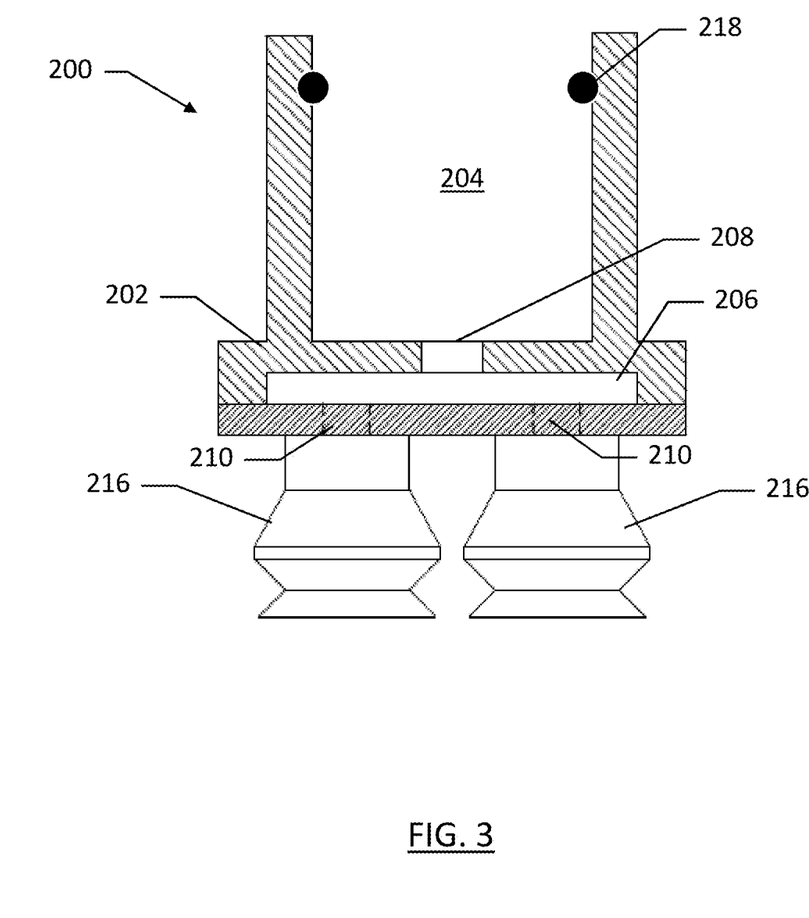
FIG. 3 illustrates an accessory tool according to an example embodiment of the present disclosure.

FIG. 3 illustrates a cross-section view of an accessory tool 200 configured to increase the lifting capacity of the end-of-arm tool 112 and to improve engagement between the accessory tool 200 and a grasped object relative to the end-of-arm tool 112. As shown, the accessory tool 200 includes a tool body 202 defining a receiver 204 on a first side of the accessory tool body 202. The accessory tool 200 further includes a manifold 206 defined by the tool body 202, where the manifold is in fluid communication with the receiver 204 through a first opening 208. The tool body 202 further defines a plurality of second openings 210, each in communication with a respective second vacuum cup 216 of a plurality of second vacuum cups. The array of the plurality of second vacuum cups 216 may be virtually limitless. For example, as the illustrated embodiment of FIG. 3 illustrates two second vacuum cups 216 in the cross sectional view, embodiments may include an array of vacuum cups such as two rows of two vacuum cups, one row of four vacuum cups, five rows of two vacuum cups, a circular array of eight vacuum cups, etc.

As will be understood to one of ordinary skill in the art, the number of second vacuum cups and their relative positions (e.g., a regular array of rows and columns, an irregular array, a circular pattern or multiple concentric circular patterns, etc.) can be of any desired configuration. Optionally, the accessory tool may include only a single vacuum cup, where the vacuum cup of the accessory tool may be sized and/or shaped to provide an enhancement over the vacuum cup 116 of the end-of-arm tool. Thus, the accessory tool as described herein can have one or more vacuum cups arranged thereon. The configuration of the second vacuum cups may be specifically configured for the type of object being grasped such that the vacuum cups may be arranged according to a weight, size, and orientation of an object to be retrieved. Still further, embodiments described herein may employ multiple accessory tools, each accessory tool used for the grasping of a specific type or class of object such that a dispensing system may select and engage an appropriate accessory tool for the object to be retrieved.

The accessory tool 200 may include a securing mechanism such as the illustrated canted spring 218 of FIG. 3. As will be described further below, the securing mechanism may be embodied by a number of different types of fastening or engaging means and the securing mechanism may be defined on the accessory tool, the end-of-arm tool, or a combination thereof.

Figure 4:
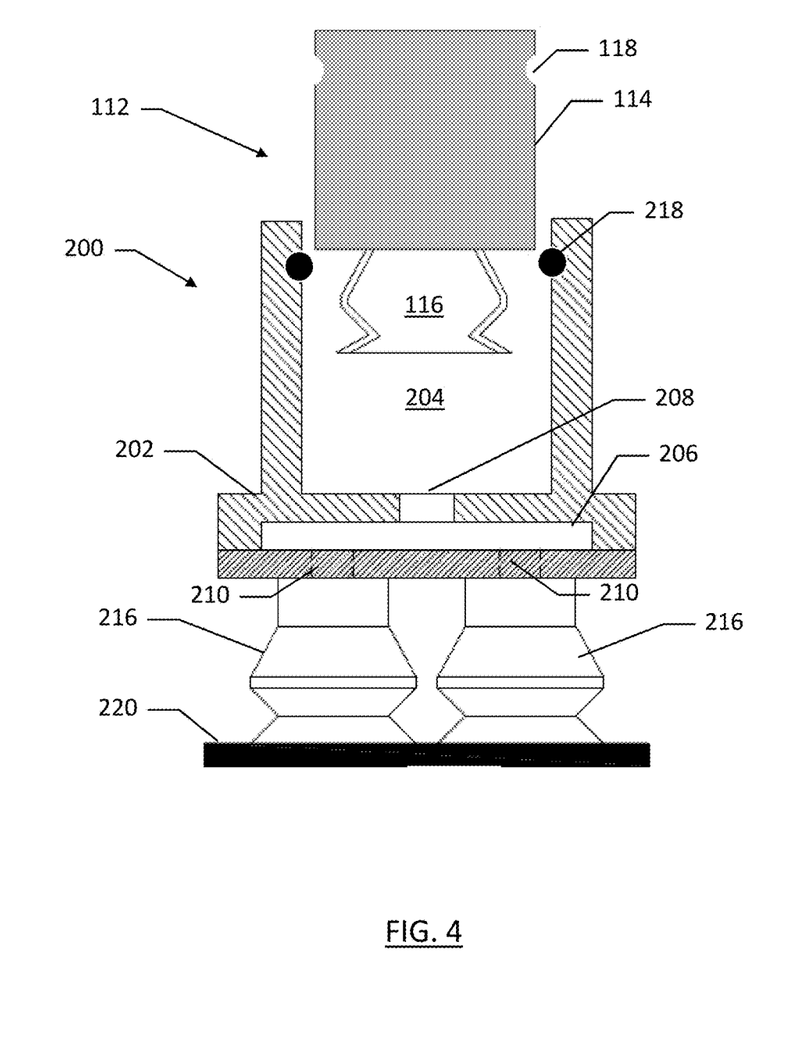
FIG. 4 illustrates an end-of-arm tool being brought into engagement with an accessory tool according to an example embodiment of the present disclosure.

The accessory tool 200 is configured to be engaged by a tool, such as the end-of-arm tool 112. FIG. 4 shows the accessory tool 200 disposed on surface 220 with end-of-arm tool 112 beginning engagement with the accessory tool. The robot 110 may advance the end-of-arm tool 112 to a known position of the accessory tool 200, which may be known to the robot as the robot may have placed the accessory tool in its present location and stored (e.g., in memory 102) the position for later retrieval. As shown, the end-of-arm tool body 114 and vacuum cup 116 are being received within the receiver 204 of the accessory tool 200. The securing mechanism 218 of the receiver 204 of the illustrated embodiment includes a complementary groove 118 of the tool body 114 to secure the end-of-arm tool 112 to the accessory tool 200 with a securing force, detailed further below.

As the tool body 114 of the end-of-arm tool 112 is received into the receiver 204, the vacuum cup 116 engages a bottom surface of the receiver with the first opening 208 such that the vacuum cup 116 is in fluid communication with the first opening 208. Through the first opening 208, the manifold 206, and the plurality of second openings 210, the vacuum cup 116 becomes fluidly connected to each of the plurality of second vacuum cups 216. The securing mechanism 218 of the receiver 204, in this case the canted spring, becomes engaged with the complementary groove 118, whereby the accessory tool 200 is held to the end-of-arm tool 112 with a securing force. As will be described further below, the securing force is greater than a weight of the accessory tool 200 such that when the end-of-arm tool lifts the accessory tool 200 from the surface 220, the accessory tool remains engaged with the end-of-arm tool and can be moved together with the end-of-arm tool.

Figure 5:
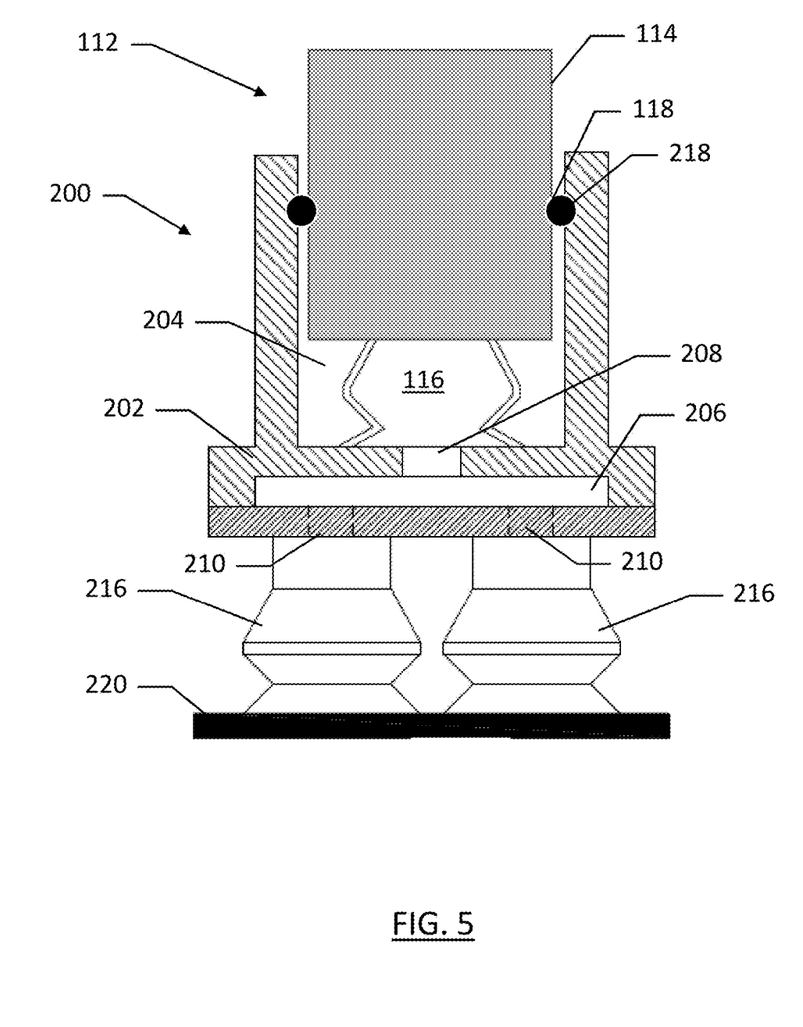
FIG. 5 illustrates an end-of-arm tool engaged with an accessory tool according to an example embodiment of the present disclosure.

Once the accessory tool 200 has been secured to the end-of-arm tool 112 with the securing force of the securing mechanism 218, the accessory tool may be lifted from the surface 220 and moved to a location where an object is to be grasped and lifted. While the securing mechanism 218 is illustrated to be a canted spring of the accessory tool 200 engaging with a corresponding groove 118 of the tool body, the securing mechanism may be embodied in a number of different ways. For example, the securing mechanism may be a canted spring on the tool body 114 engaging a complementary groove within the receiver 204. The securing mechanism may optionally include one or more magnets, such as a magnet on the tool body 114 engaging a magnet of the receiver 204, or a magnet on either the tool body or within the receiver configured to engage a magnetically attractive material of the other of the tool body or the receiver. Other securing mechanisms may include a gasket such as an O-ring used in place of a canted spring (which may be considered spring-loaded), a spring biased cylinder and corresponding detent mechanism similar to those used to retain sockets on a ratchet, a frictional engagement between the tool body 114 and the receiver 204, or a vacuum activated latch. Any of these securing mechanisms may be employed to attach the accessory tool 200 to the tool body 114 of the end-of-arm tool 112 with a securing force that is greater than a weight of the accessory tool. The securing force being the force with which the accessory tool 200 is held to the tool body 114, and requiring a securing force greater than the weight of the accessory tool such that the weight of the tool will not overcome the securing force when the end-of-arm-tool 112 is lifted, thereby lifting the accessory tool.

The securing force of the securing mechanism is designed to be sufficient to secure the accessory tool 200 to the tool body 114, though the securing force does not need to be substantially greater than a weight of the accessory tool body. When the accessory tool 200 is used to grasp an object, the accessory tool is further secured to the end-of-arm tool 112 due to the vacuum cup 116 engagement of the accessory tool as detailed herein.

The accessory tool 200 is designed to improve both the lifting capacity of the end-of-arm tool 112 and increase the mobility of the end-of-arm tool when transporting objects grasped by the accessory tool. As noted above, the accessory tool may be configured with an array of second vacuum cups 216 arranged in any pattern or configuration suitable for grasping objects of a particular size and/or shape. Multiple accessory tools 200 may be employed for grasping varying shapes of objects depending upon the implementation of the accessory tool as described herein.

Figure 6:
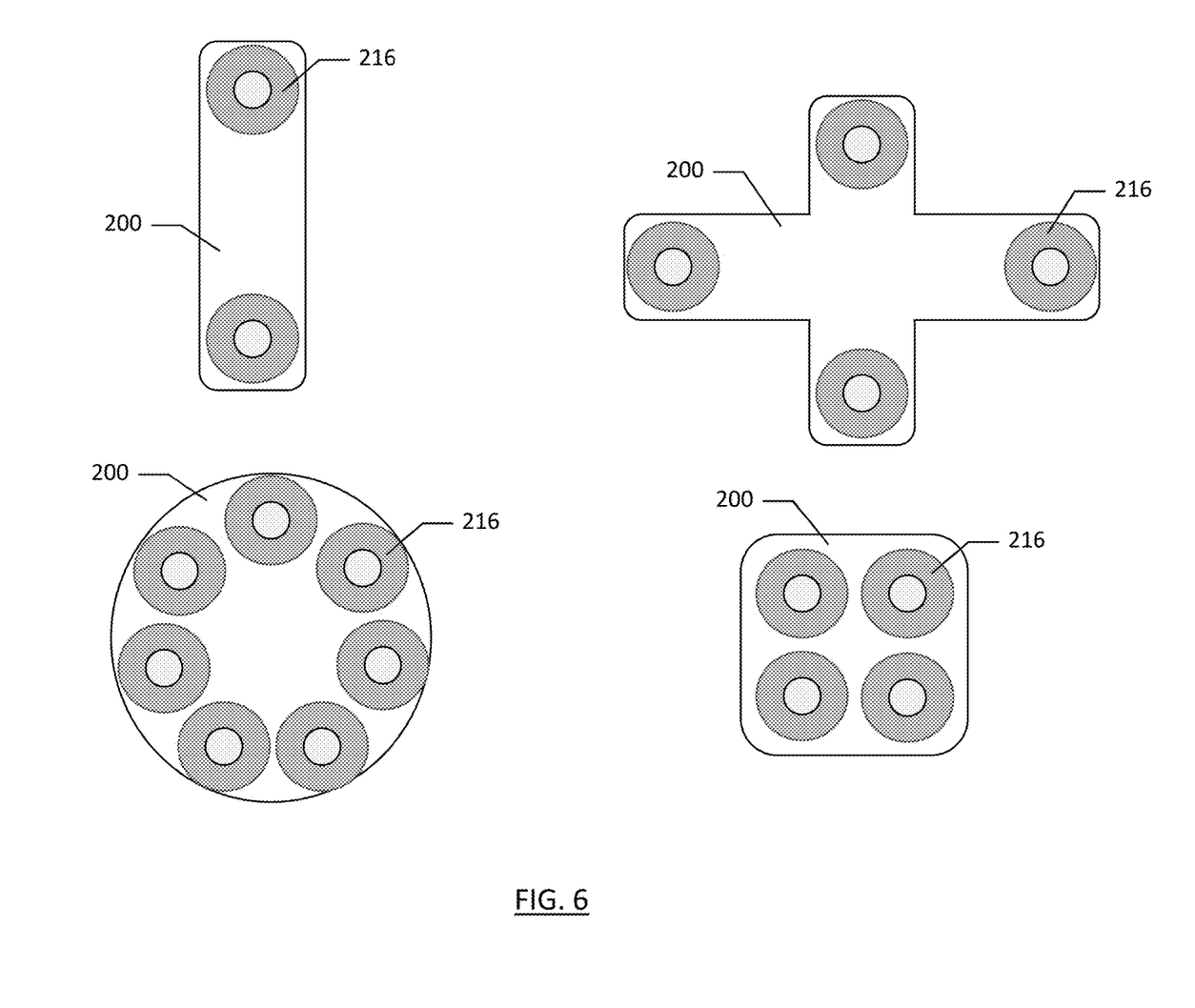
FIG. 6 illustrates several examples of accessory tools and configurations thereof according to an example embodiment of the present disclosure.

FIG. 6 illustrates several example embodiments of accessory tools 200 and a plurality of second vacuum cups 216. As shown, the accessory tool 200 may take various forms with the vacuum cups of the accessory tool arranged and spaced as needed for optimizing the engagement of the vacuum cups with an object to be grasped. Each of the accessory tools 200 of FIG. 6 may employ a receiver 204 and manifold 206 as illustrated with respect to the accessory tool 200 of FIG. 3 through 5 to accomplish the improved capacity and stability of a grasped object as described herein. According to some embodiments, as noted above, the accessory tool may include only a single vacuum cup that may be sized or shaped to improve lifting capacity and/or stability relative to the vacuum cup 116 of the end-of-arm tool 112.

Beyond the improvements to the stability of the grasping and transporting of an object using a plurality of second vacuum cups, embodiments described herein improve lifting capacity of the end-of-arm tool 112 through the use of the accessory tool 200. When the tool body 114 is received within the receiver 204 and the first vacuum cup 116 engages a bottom of the receiver, the vacuum cup engages itself about the first opening 208. In response to the vacuum source drawing a vacuum on the end-of-arm tool 112 through the first vacuum cup 116, the same vacuum pressure is drawn through the first opening 208, the manifold 206, the plurality of second openings 210, and the plurality of second vacuum cups 216 as shown by arrows 240 in FIG. 7. The suction force is thereby increased as the suction force of the single vacuum cup 116 is the negative pressure (relative to atmospheric) multiplied by the area of engagement or contact area of the vacuum cup. The accessory tool 200 increases the suction force available for engagement by increasing the contact area through the use of more vacuum cups 216.

Figure 7:
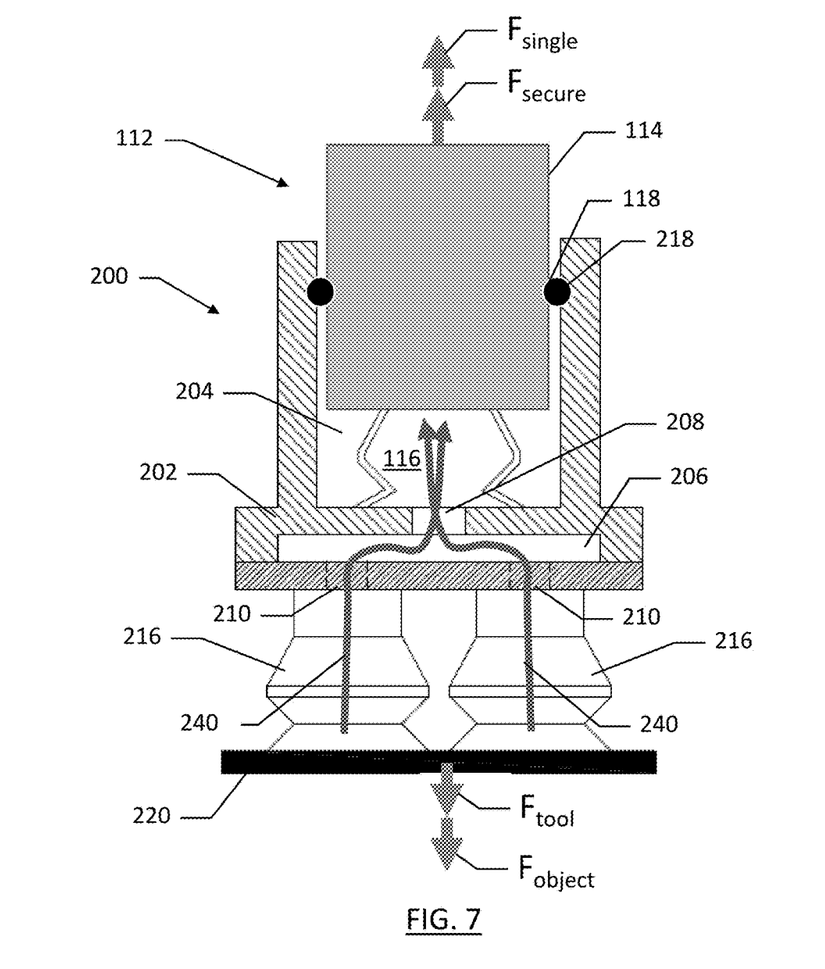
FIG. 7 illustrates depicts the forces involved in coupling and decoupling an accessory tool from an end-of-arm tool according to an example embodiment of the present disclosure.

While the first vacuum cup 116 is limited in an engagement force created through the vacuum, the securing mechanism 218 increases the lifting capacity of the tool by providing the securing force. FIG. 7 illustrates the increased capacity of the end-of-arm tool through the use of the accessory tool 200 in that the lifting capacity becomes the sum of the force of the single vacuum cup ($F_{single}$) and the securing force ($F_{secure}$). The forces acting against the lifting capacity include the weight of the accessory tool (i.e., the mass of the accessory tool multiplied by the acceleration due to gravity, $F_{tool}$) and the weight of the object being lifted ($F_{object}$). In this manner, the end-of-arm tool 112 in conjunction with the accessory tool 200 has a substantially increased lifting capacity for lifting and moving objects.

An example embodiment is herein described with exemplary forces. While the forces below represent an example embodiment, it is appreciated that various combinations and magnitudes of forces can be used while achieving the benefits identified herein, such that the forces of the example embodiment are not intended to be limiting.

According to an example embodiment, the engagement force of a single vacuum cup may be or 4.0 pounds ($F_{single}$=4 lb) while the securing force may be 3 pounds ($F_{secure}$=3 lb). The force of the single vacuum cup may be derived from the area of the vacuum cup multiplied by the vacuum pressure. For example, a single vacuum cup with a 1.0-inch diameter contact area has an engagement force of 4.0 lbs when the vacuum pressure is approximately five pounds per-square-inch (5 psi) below atmospheric pressure. The securing force may be accomplished by any of the means described above. A weight of the tool may vary depending up on the configuration and size of the tool; however, an example embodiment may weigh 0.5 lbs. In such an embodiment, the lifting capacity of the tool would be:

$$F_{single}+F_{secure}-F_{tool}=F_{object}$$

4.0 lbs+3.0 lbs−0.5 lbs=6.5 lbs

However, given that the lifting capacity of the tool $F_{object}$ defines an absolute maximum lifting capacity, a safety factor may be considered when establishing the maximum object weight that should be carried by the accessory tool 200. That safety factor may be determined based on the specific implementation of the tool, and may be a safety factor of about two, where the maximum object weight carried is half of maximum capacity, to about ten, where the maximum object weight carried is a tenth of the maximum capacity, for example. However, this safety factor may be used for both the single vacuum cup of the end-of-arm tool 112 as well as the accessory tool 200.

Beyond the identified advantages of the accessory tool of improving the lifting capacity and stability of objects carried by the accessory tool relative to the end-of-arm tool, embodiments described herein may provide for tool-free disconnection of the accessory tool from the end-of-arm tool. The robot 110 may function in an environment where object retrieval and transport are performed across a work area. The ability to connect and disconnect the end-of-arm tool 112 of the robot 110 to an accessory tool 200 without necessitating a docking station or fixed location where the accessory tool may be kept provides an opportunity to improve the efficiency with which the robot operates in the work area. Embodiments of the accessory tool 200 described herein can be connected and disconnected without requiring tools or a specific docking station/location in the work area.

As described above, the lifting capacity of the accessory tool is limited by the sum of the securing force ($F_{secure}$) and the engagement force of the single vacuum cup 116 ($F_{single}$). A force greater than this sum would result in the accessory tool 200 being disconnected from the end-of-arm tool 112. Such a force is described herein as a "decoupling force." The accessory tool, by virtue of the plurality of second vacuum cups 216, is capable of attaching to a surface with an engagement force greater than that of the lifting capacity of the end-of-arm tool 112 when secured to the accessory tool 200. As described above, the lifting capacity is limited to the sum of the engagement force of the single vacuum cup 116 ($F_{single}$) and the securing force ($F_{secure}$) minus the weight of the tool ($F_{tool}$). Using the example embodiment above, this force is 6.5 lbs. According to that example, an accessory tool 200 having four vacuum cups 216 each of a one-inch connection area could engage a surface (e.g., surface 220) with a force of 16 pounds with the same pressure of five pounds per-square-inch below atmospheric pressure. This engagement force is substantially higher than the lifting capacity and thus sufficient to provide a decoupling force.

To accomplish the decoupling process of disconnecting the end-of-arm tool 112 from the accessory tool 200, the robot 110 may advance the end-of-arm tool and attached accessory tool to a location (preferably a horizontal surface or relatively horizontal surface) where a sufficient number of the plurality of second vacuum cups 216 are in contact with the surface. Once the robot has placed the accessory tool 200 on a surface with the vacuum cups contacting the surface, the vacuum source may draw vacuum (e.g., as may be controlled by the controller of FIG. 1) to create an engagement force between the vacuum cups 216 of the accessory tool 200 and the surface 220 shown below as $F_{surface}$.

$$F_{single}+F_{secure}-F_{tool}<F_{surface}$$

In the aforementioned embodiment having four vacuum cups 216, the vacuum source may draw vacuum to create an engagement force between each of the four vacuum cups and the surface 220. The robot 110, while vacuum is still being drawn, may then pull the end-of-arm tool 112 from the receiver 204 of the accessory tool 200. The force of engagement $F_{surface}$ between the accessory tool 200 and the surface 220 is sufficiently large that the securing force $F_{secure}$ and the $F_{single}$ are overcome, and the securing mechanism is disengaged such that the end-of-arm tool 112 is removed from the receiver 204.

The controller of the robot 110 may store the location where the accessory tool 200 was disconnected such that the accessory tool can be retrieved at any point. Further, multiple accessory tools may be employed to be coupled to a variety of different objects and may be similarly attached/detached from the end-of-arm tool 112 at various locations throughout the work area. The locations may be established based on a frequency of use in order to optimize the position of the one or more accessory tools and to further enhance the efficiency with which retrieval, transport, and dispensing may occur from example embodiments described herein.

As described above, articles of varying sizes, shapes, and weights can be retrieved, transported, and dispensed using various embodiments as described herein. The use of one or more accessory tools may be employed to improve the lifting capacity and transport efficiency of the systems of example embodiments. The controller of example embodiments may be configured to store in the memory 102 a weight and packaging configuration of an object to be retrieved in order to identify the appropriate accessory tool with which retrieval is best suited.

Some example embodiments provided herein may include the retrieval of objects with unknown packaging configurations, or the packaging configurations may not be consistent between similar articles. For example, when articles are in overpacks, two articles of the same identification may have different form factors. As such, an example embodiment provided herein may include an end-of-arm tool 112 having a vision system configured to determine the form factor shape and size. Based on the vision system scanning the object, the appropriate accessory tool 200 may be established.

Figure 8:
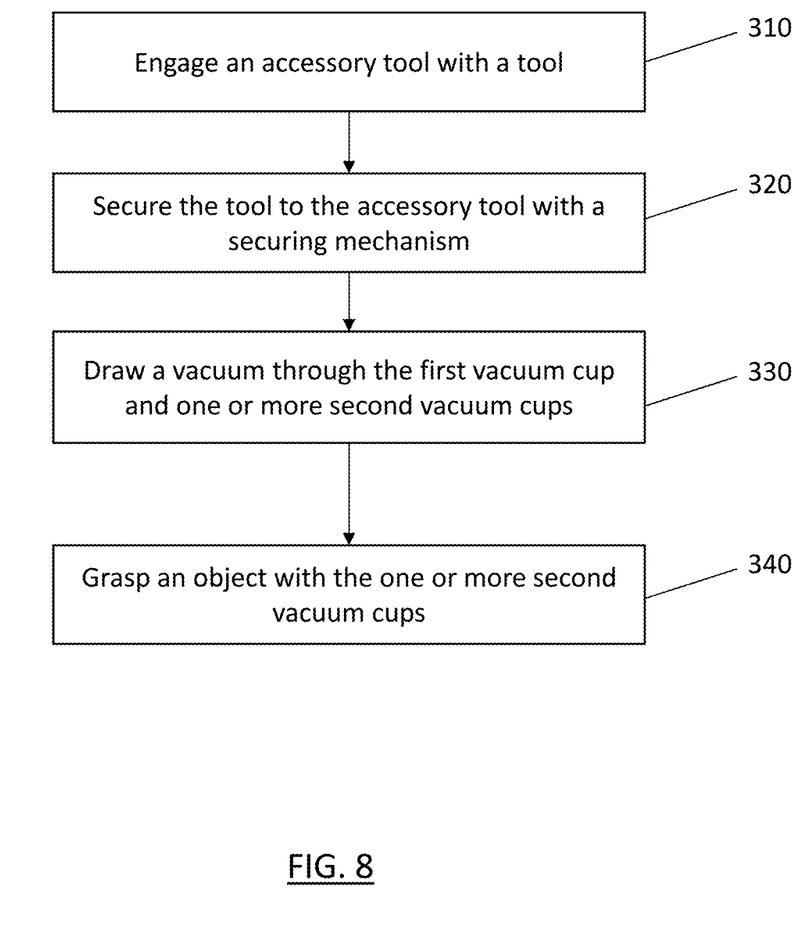
FIG. 8 is a flowchart of a method of operation of an accessory tool including the coupling and decoupling thereof from an end-of-arm tool according to an example embodiment of the present disclosure.

FIG. 8 is a flowchart of a method and program product according to an example embodiment of the present disclosure. It will be understood that each block of the flowchart and combinations of blocks in the flowchart may be implemented by various means, such as hardware, firmware, processor, circuitry, and/or other devices associated with execution of software including one or more computer program instructions. These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the disclosure, as shown in FIG. 8, may include engaging an accessory tool with a tool as shown at 310, where the tool includes a first vacuum cup and the accessory tool includes one or more second vacuum cups. The tool may be secured to the accessory tool at 320 using a securing mechanism. A vacuum is drawn at 330 through the first vacuum cup, where a vacuum is drawn through the one or more second vacuum cups in response to vacuum being drawn through the first vacuum cup while the tool is engaged with the accessory tool. An object is grasped at 340 with the one or more second vacuum cups in response to vacuum drawn through the one or more second vacuum cups and the one or more second vacuum cups engaging a surface of the object.

In some embodiments, certain ones of the operations may be modified or further amplified as described below. Moreover, in some embodiments additional operations may also be included. It should be appreciated that each of the modifications, optional additions, or amplifications below may be included with the operations above either alone or in combination with any others among the features described herein.

In an example embodiment, an apparatus for performing the method of FIG. 8 may include a processor (e.g., processor 100 of FIG. 1) configured to perform some or all of the operations (310-340) described above. The processor may, for example, be configured to perform the operations (310-340) by performing hardware implemented logical functions executing stored instructions, or executing algorithms for performing each of the operations. Alternatively, the apparatus may include means for performing each of the operations described above.

An example of an apparatus according to an example embodiment may include at least one processor and at least one memory including computer program code. The at least one memory and the computer program code may be configured to, with the at least one processor, cause the apparatus to perform the operations 310-340.

An example of a computer program product according to an example embodiment may include at least one computer-readable storage medium having computer-executable program code portions stored therein. The computer-executable program code portions may include program code instructions for performing operations 310-340.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An accessory tool comprising:
an accessory tool body defining, on a first side a receiver, and defining within the accessory tool body a manifold, wherein a first opening to the manifold is defined within the receiver, and one or more second openings to the manifold are defined within a second side of the accessory tool body, opposite the first side;
one or more second vacuum cups attached to the second side of the accessory tool body, wherein each of the one or more second vacuum cups is in fluid communication with a respective second opening; and
a securing mechanism within the receiver, wherein in response to a primary tool received within the receiver and a first vacuum cup of the primary tool engaging with the first opening, the securing mechanism secures the primary tool in the receiver with a securing force, wherein the accessory tool is configured to engage a surface with the one or more second vacuum cups in response to the primary tool received within the receiver and a vacuum drawn through the primary tool, wherein the securing mechanism is configured to release the primary tool in response to the primary tool being withdrawn from the receiver with a separation force greater than the securing force while the accessory tool is engaged with the surface.

2. The accessory tool of claim 1, wherein the securing mechanism enables separation of the accessory tool from the primary tool in response to the separation force of the primary tool from the receiver of above the securing force, and wherein the securing force is greater than a weight of the accessory tool.

3. The accessory tool of claim 1, wherein in response to the first vacuum cup of the tool attaching to the first opening and drawing vacuum, vacuum is drawn through each of the one or more second vacuum cups of the accessory tool.

4. The accessory tool of claim 3, wherein the first vacuum cup of the tool defines a first contact area, wherein the one or more second vacuum cups attached to the accessory tool body define a second contact area, wherein the second contact area is a sum of contact areas of each of the one or more second vacuum cups attached to the accessory tool, and wherein the second contact area is greater than the first contact area.

5. The accessory tool of claim 4, wherein the one or more second vacuum cups of the accessory tool are configured to attach to an object with an accessory tool engagement force in response to the first vacuum cup of the tool engaging with the first opening and drawing a vacuum of a first pressure through the first vacuum cup of the primary tool while the one or more second vacuum cups of the accessory tool are in contact with the object.

6. The accessory tool of claim 5, wherein the accessory tool engagement force is greater than a force with which the first vacuum cup of the primary tool can engage an object while drawing a vacuum of the first pressure.

7. The accessory tool of claim 1, wherein the securing mechanism comprises a canted spring disposed within the receiver, wherein the securing mechanism is received within a complementary groove in the receiver of the accessory tool body, wherein the canted spring engages a groove in the primary tool in response to the primary tool being received within the receiver.

8. The accessory tool of claim 1, wherein the securing mechanism comprises at least one magnet, wherein the at least one magnet provides engagement between the primary tool and the receiver in response to the tool being received within the receiver.

9. The accessory tool of claim 1, wherein the securing mechanism comprises at least one spring biased cylinder and corresponding detent mechanism.

10. The accessory tool of claim 1, wherein the securing force is lower than an engagement force between the one or more second vacuum cups of the accessory tool and the surface.

11. A system for increasing the capacity of a tool comprising:
a tool having a tool body and a first vacuum cup extending from a leading end of the tool body;
an accessory tool having an accessory tool body defining, on a first side a receiver, and defining within the accessory tool body a manifold, wherein a first opening to the manifold is defined within the receiver, and one or more second openings to the manifold are defined within a second side of the accessory tool body, opposite the first side;
one or more second vacuum cups attached to the second side of the accessory tool body, wherein each of the one or more second vacuum cups is in fluid communication with a respective second opening; and
a securing mechanism to secure the tool to the accessory tool, wherein, in response to the leading end of the tool body being received within the receiver, the securing mechanism secures the accessory tool to the tool body with a securing force wherein the accessory tool is configured to engage a surface with the one or more second vacuum cups in response to the tool received within the receiver and a vacuum drawn through the tool, wherein the securing mechanism is configured to release the tool in response to the tool being withdrawn from the receiver with a separation force greater than the securing force while the accessory tool is engaged with the surface.

12. The system of claim 11, wherein the tool and the accessory tool are separable in response to the separation force between the tool and the accessory tool above a predefined value, and wherein the predefined value is greater than a weight of the accessory tool.

13. The system of claim 11, further comprising a vacuum source, wherein a vacuum is drawn through the one or more second vacuum cups in response to the tool engaging the accessory tool, the first vacuum cup engaging the first opening to the manifold, and the vacuum source drawing vacuum through the first vacuum cup.

14. The system of claim 13, wherein the first vacuum cup defines a first engagement area, wherein the one or more second vacuum cups define a second engagement area greater than the first engagement area, and wherein a lifting capacity of the one or more second vacuum cups is greater than a lifting capacity of the first vacuum cup.

15. The system of claim 11, wherein the first vacuum cup has a first lifting capacity, wherein the one or more second vacuum cups has a second lifting capacity, and wherein the second lifting capacity is a sum of the securing force with the first lifting capacity.

16. The system of claim 15, wherein the one or more second vacuum cups has an engagement capacity whereby the one or more second vacuum cups engage a surface, and wherein the engagement capacity is greater than the second lifting capacity.

17. A method of increasing the capacity of a tool, comprising:
engaging an accessory tool with a tool, wherein the tool comprises a first vacuum cup and wherein the accessory tool comprises one or more second vacuum cups;
securing the tool to the accessory tool with a securing mechanism;
drawing a vacuum through the first vacuum cup, wherein vacuum is drawn through the one or more second vacuum cups in response to drawing a vacuum through the first vacuum cup while the accessory tool is engaged with the tool;
grasping an object with the one or more second vacuum cups in response to vacuum drawn through the one or more second vacuum cups and the one or more second vacuum cups engaging a surface of the object,
wherein securing the tool to the accessory tool with a securing mechanism comprises securing the tool to the accessory tool with a securing force, and wherein the tool is separable from the accessory tool in response to the tool being pulled relative to the accessory tool with a force greater than the securing force; and
removing the accessory tool from the tool by:
engaging a fixed surface with an engagement force in response to a vacuum being drawn through the one or more second vacuum cups and the one or more second vacuum cups being brought into contact with the fixed surface; and
moving the tool away from the fixed surface with a decoupling force greater than the securing force, wherein the decoupling force is greater than a weight of the accessory tool, and less than the engagement force.

18. A detachable accessory tool for use in grasping objects, comprising:
an accessory tool body defining a first end and a second end defining a passage therethrough and adapted to temporarily couple with a leading end of a primary tool, wherein the first end of the accessory tool body is adapted to interface with the leading end of the primary tool, wherein the second end of the accessory tool body comprises one or more vacuum cups adapted to securely hold and displace an object from an object origin to an object destination,
wherein the accessory tool is adapted to temporarily couple with the leading end of the primary tool using a securing mechanism, wherein the securing mechanism provides a frictional engagement between the accessory tool and the primary tool, and wherein the accessory tool is adapted to decouple from the primary tool at any surface in response to vacuum drawn through the one or more vacuum cups to engage the surface with the one or more vacuum cups and the primary tool being moved away from the surface with a force sufficient to overcome the frictional engagement between the accessory tool and the primary tool.

19. The detachable accessory tool of claim 18, wherein the primary tool is fluidically connected to the one or more vacuum cups of the accessory tool in response to the accessory tool being coupled to the first end of the primary tool.

\* \* \* \* \*